US010464442B2

(12) United States Patent
Iwamoto et al.

(10) Patent No.: US 10,464,442 B2
(45) Date of Patent: Nov. 5, 2019

(54) NON-CONTACT POWER SUPPLY SYSTEM AND POWER TRANSMISSION APPARATUS, AND DESIGNING METHOD AND INSTALLING METHOD OF POWER TRANSMISSION APPARATUS (71) Applicant: HONDA MOTOR CO., LTD., Tokyo (JP)

(72) Inventors: Takuya Iwamoto, Wako (JP); Tomoaki Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 15/726,528

(22) Filed: Oct. 6, 2017

(65) Prior Publication Data
US 2018/0099576 A1  Apr. 12, 2018

(30) Foreign Application Priority Data

Oct. 11, 2016  (JP) ................... 2016-200171
Nov. 22, 2016  (JP) ................... 2016-227152

(51) Int. Cl.
*B60L 53/60* (2019.01)
*B60L 53/12* (2019.01)
(Continued)

(52) U.S. Cl.
CPC ............... *B60L 53/60* (2019.02); *B60L 3/00* (2013.01); *B60L 53/12* (2019.02); *B60L 53/124* (2019.02);
(Continued)

(58) Field of Classification Search
CPC .......... B60L 53/60; B60L 53/12; B60L 53/30; B60L 3/00; B60L 11/1838; H04B 5/0093;
(Continued)

(56) References Cited

U.S. PATENT DOCUMENTS 9,588,550 B2 * 3/2017 Smith .................... G06F 1/1613
9,923,406 B2 * 3/2018 Percebon ................ H02J 7/042
(Continued)

FOREIGN PATENT DOCUMENTS

JP  2010-226946 A  10/2010
JP  2013-153132 A  8/2013
(Continued)

OTHER PUBLICATIONS

Office Action dated Jun. 19, 2018, issued in counterpart Japanese Application No. 2016-227152, with English machine translation. (5 pages).
(Continued)

*Primary Examiner* — M Baye Diao
(74) *Attorney, Agent, or Firm* — Westerman, Hattori, Daniels & Adrian, LLP (57) ABSTRACT A non-contact power supply system includes a power receiving unit mounted on a vehicle, a power transmitting unit which is disposed on a plane and which transmits electric power to the power receiving unit in a non-contact manner, and a housing which projects in a vertical direction from the plane and which accommodates the power transmitting unit. The housing has a height in a vertical direction which satisfies a condition that a vertical height of at least part of a gap defined by a bottom surface of the vehicle and an upper surface of the housing is less than 15 cm and equal to or more than 5 cm. Therefore, the non-contact power supply system which satisfies a standard for exposure of a human body to electromagnetic field and which is free from an occurrence of a physical contact with a bottom surface of a vehicle is provided.

2 Claims, 7 Drawing Sheets (51) Int. Cl.
*B60L 53/30* (2019.01)
*B60L 3/00* (2019.01)
*H04B 5/00* (2006.01)
*H02J 7/02* (2016.01)
*B60L 53/124* (2019.01)
*B60K 1/04* (2019.01)

(52) U.S. Cl.
CPC .............. *B60L 53/30* (2019.02); *H02J 7/025* (2013.01); *H04B 5/0037* (2013.01); *H04B 5/0093* (2013.01); *B60K 1/04* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01)

(58) Field of Classification Search
CPC ......... H04B 5/0037; B60K 1/04; H02J 7/025; Y02T 90/14; Y02T 90/121; Y02T 90/122; Y02T 90/12; Y02T 10/7005; Y02T 10/7072
USPC ......................................................... 320/109
See application file for complete search history.

(56) References Cited

U.S. PATENT DOCUMENTS

| | | | |
|---|---|---|---|
| 2010/0065352 A1* | 3/2010 | Ichikawa | ................ H01F 27/26 180/65.8 |
| 2011/0049998 A1* | 3/2011 | Karalis | .................. B60L 53/12 307/104 |
| 2013/0181797 A1 | 7/2013 | Hickox | |
| 2016/0052406 A1 | 2/2016 | Ohashi et al. | |
| 2018/0366985 A1* | 12/2018 | Henkel | ................... H02J 50/60 |

FOREIGN PATENT DOCUMENTS

| | | |
|---|---|---|
| JP | 2013-219210 A | 10/2013 |
| JP | 2014-121126 A | 6/2014 |
| JP | 2014-192939 A | 10/2014 |
| JP | 5606098 B2 | 10/2014 |
| WO | 2015/171910 A1 | 11/2015 |

OTHER PUBLICATIONS

Office Action dated Mar. 27, 2018, issued in counterpart Japanese Application No. 2016-227152. (3 pages).

* cited by examiner

FIG.7

NON-CONTACT POWER SUPPLY SYSTEM AND POWER TRANSMISSION APPARATUS, AND DESIGNING METHOD AND INSTALLING METHOD OF POWER TRANSMISSION APPARATUS

CROSS REFERENCE TO RELATED APPLICATIONS

This application is based on Japanese Patent Application (No. 2016-200171) filed on Oct. 11, 2016 and Japanese Patent Application (No. 2016-227152) filed on Nov. 22, 2016, the contents of which are incorporated herein by reference.

TECHNICAL FIELD

The present invention relates to a non-contact power supply system and a power transmission apparatus utilizing a non-contact power transmission technology, and a designing method and an installing method of the power transmission apparatus.

BACKGROUND ART

Patent literature 1 describes a power supply system for supplying electric power to a vehicle in a non-contact manner which can execute a safe and efficient power supply without allowing foreign matters to enter a space defined between a power supplying unit and a power receiving unit. In this system, an electrically insulating isolation member is provided to prevent foreign matters from entering the space between the power supplying unit and the power receiving unit. The isolation member is either embedded in a parking space or accommodated in an interior of the vehicle, and when supplying electric power to the vehicle, the isolation member is caused to project into the space via a movable portion. The isolation member is formed into a rectangular frame shape (in other words, a cylindrical shape) which is opened upwards and downwards by using four isolation members of an electrically isolating material so as to surround a space defined by respective projected planes of the power receiving unit and the power supplying unit when the power receiving unit and the power supplying unit are disposed to face each other. Further, a vertical length of the isolation member (in other words, a height of the isolation member in an axial direction thereof) is set at a predetermined dimension which is slightly smaller than a space defined by a road surface of the parking space where the power supplying unit is provided and a bottom surface of the vehicle.

RELATED ART LITERATURE

Patent Literature

Patent Literature 1: JP-B-5606098

SUMMARY OF THE INVENTION

Problem that the Invention is to Solve

According to the power supply system of patent literature 1 described above, the foreign matters can be prevented from entering the space between the power supplying unit and the power receiving unit by the isolation member. However, since the road clearance of the vehicle changes depending on the number of occupants or the amount of cargo loaded on the vehicle, there is a possibility that an upper portion of the isolation member is brought into contact with a bottom surface of the vehicle. Then, when the height of the isolation member is lowered to avoid such a contact, the possibility of foreign matters entering the space between the power supplying unit and the power receiving unit, and therefore, the reduction in height of the isolation member is not desirable. In particular, in supplying electric power to the vehicle in a non-contact manner, for example, in a case where a magnetic field generated between the power supplying unit and the power receiving unit exceeds a reference value, for example, the standard of the Society of Automotive Engineers prescribes a regulation under "SAE J2954 v.39 draft" that a preventive measure is to be taken against the exposure of a human body to magnetic field. Because of this, power supply systems have been desired which satisfy the SAE standard for exposure of a human body to magnetic field and which are free from a physical contact with a bottom surface of a vehicle.

An object of the invention is to provide a non-contact power supply system and a power transmission apparatus which satisfy the standard for exposure of a human body to magnetic field and which are free from a physical contact with a bottom surface of a vehicle, and a designing method and an installing method of the power transmission apparatus.

Means for Solving the Problem

With a view to achieving the object described above, according to an invention of (1), there is provided a non-contact power supply system including:

a power receiving unit (for example, a power reception apparatus 10 in an embodiment) which is mounted on a vehicle (for example, an electric vehicle 11 in an embodiment);

a power transmitting unit (for example, a primary coil 101 in an embodiment) which is disposed on a plane and which transmits electric power to the power receiving unit in a non-contact manner; and a housing (for example, a housing 103 in an embodiment) which projects in a vertical direction from the plane and which accommodates the power transmitting unit, wherein the housing has a height in a vertical direction which satisfies a condition that a vertical height of at least part of a gap defined by a bottom surface of the vehicle and an upper surface of the housing is less than 15 cm and equal to or more than 5 cm.

According to an invention of (2), in the invention of (1), the housing has a height in a vertical direction such that the gap at least at one of a front and a rear of the housing in a front-rear direction of the vehicle which is parked in a parking position where the power transmitting unit is disposed satisfies the condition.

According to an invention of (3), in the invention of (1), the housing has a height in a vertical direction such that the gap at a front and a rear of the housing in a front-rear direction of the vehicle which is parked in a parking position where the power transmitting unit is disposed satisfies the condition.

According to an invention of (4), there is disposed a power transmission apparatus including:

a power transmitting unit (for example, a primary coil 101 in an embodiment) which is disposed on a plane and which transmits electric power in a non-contact manner to a power receiving unit (for example, the power reception apparatus 10 in an embodiment) mounted on a vehicle (for example, the electric vehicle 11 in an embodiment); and a housing (for example, the housing 103 in an embodiment) which projects in a vertical direction from the plane and which accommodates the power transmission unit, wherein the housing a height in a vertical direction which satisfies a condition that a vertical height of at least part of a gap defined by a bottom surface of the vehicle and an upper surface of the housing is less than 15 cm and equal to or more than 5 cm.

According to an invention of (5), there is provided a designing method of a power transmission apparatus, including:

a first step of determining an average value of a head length of a human body;

a second step of determining a maximum value of a vertical lowering amount of a vehicle (for example, the electric vehicle 11 in an embodiment) on which a power receiving unit (for example, the power reception apparatus 10 in an embodiment) is mounted, based on at least one of an occupant riding and a cargo loaded on the vehicle; and a third step of determining a size of a housing (for example, the housing 103 in an embodiment) which accommodates a power transmitting unit (for example, the primary coil 101 in an embodiment) disposed on a plane and transmitting electric power in a non-contact manner to the power receiving unit, and which projects in a vertical direction from the plane, wherein in the third step, a vertical height of the housing is determined so as to satisfy a condition that a vertical height of at least part of a gap defined by a bottom surface of the vehicle and an upper surface of the housing is less than 15 cm and equal to or more than 5 cm, and the condition is a length which is determined based on the average value determined in the first step and the maximum value determined in the second step.

According to an invention of (6), there is provided an installing method of a power transmission apparatus, including the steps of:

installing a power transmitting unit (for example, the primary coil 101 in an embodiment) which transmits electric power in a non-contact manner to a power receiving unit (for example, the power reception apparatus 10 in an embodiment) mounted on a vehicle (for example, the electric vehicle 11 in an embodiment), on a plane; and installing a housing (for example, the housing 103 in an embodiment) which accommodates the power transmitting unit in a state that the housing projects in a vertical direction from the plane, so as to satisfy a condition that a vertical height of at least part of a gap defined by a bottom surface of the vehicle and an upper surface of the housing is less than 15 cm and equal to or more than 5 cm, wherein the condition is determined based on both of:

an average value of a head length of a human body, and a maximum value of a vertical lowering amount of the vehicle based on at least one of an occupant riding and a cargo loaded on the vehicle.

Advantages of the Invention

In the inventions of (1) and (4) to (6), the housing is formed to have a height in a vertical direction such that a vertical height of at least the part of the gap defined by the bottom surface of the vehicle and the upper surface of the housing is less than 15 cm and equal to or more than 5 cm. The condition that the height of the gap is less than 15 cm is induced from the fact that an average value of head lengths of infants which constitutes a smallest value in average values of head lengths of various age levels from infants to adults is 15 cm. Additionally, the condition that the vertical height of the gap is equal to or more than 5 cm is induced from the fact that a maximum value of the vertical lowering amount of the vehicle based on an occupant riding or a cargo loaded on the vehicle is 5 cm. Due to this, according to the invention of (1), since the height of the gap is less than the average value (15 cm) of the head lengths of infants, it is possible to prevent a head portion of a human body from entering the gap. In addition, since the height of the gap is equal to or more than the maximum value (5 cm) of the lowering amount of the vehicle, even though the ground clearance of the vehicle is lowered when an occupant gets on the vehicle, an upper portion of the housing is not brought into contact with the bottom surface of the vehicle. In this way, the non-contact power supply system and the power transmission apparatus, and the methods for designing and installing the power transmission apparatus of the invention satisfy the standard for exposure of a human body to magnetic field which is prescribed in the related standard and the like and prevent an occurrence of a physical contact of the power transmission apparatus with the bottom surface of the vehicle.

According to the inventions of (2) and (3), with the housing situated between two wheels of the vehicle which are provided spaced apart from each other in a widthwise direction thereof, the head portion can be prevented from entering the gap defined by the bottom surface of the vehicle and the upper surface of the housing from the widthwise direction by the two wheels. In addition, since the height of the gap at least at one of the front and rear of the housing is less than the average value of the head lengths of infants, it is possible to prevent the head portion from entering e gap from the from and rear of the vehicle.

MODE FOR CARRYING OUT THE INVENTION

Hereinafter, referring to accompanying drawings, embodiments of the invention will be described. It should be noted that the drawings are seen in a direction in which reference numerals given therein look normal. When referred to in the following description, front and rear, left and right, and up and down denote directions as seen from a driver, and a front, rear, left, right, up or top and down or bottom of a vehicle are denoted by Fr, Rr, L, R, U and D, respectively.

Figure 1:
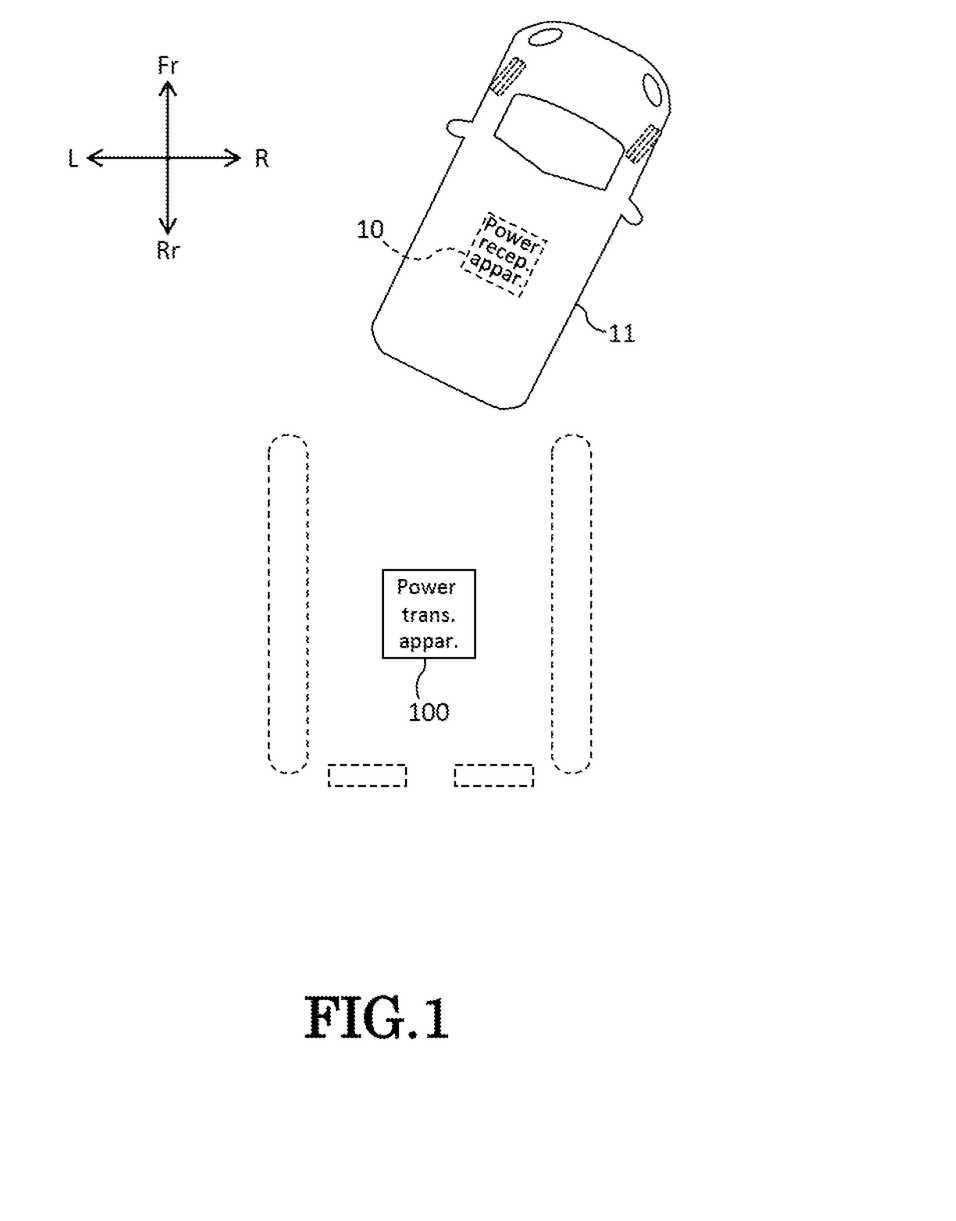
FIG. 1 is a top view showing a state in which an electric vehicle is in the midst of being driven to be parked in a parking position where a power transmission apparatus is disposed.
Figure 2:
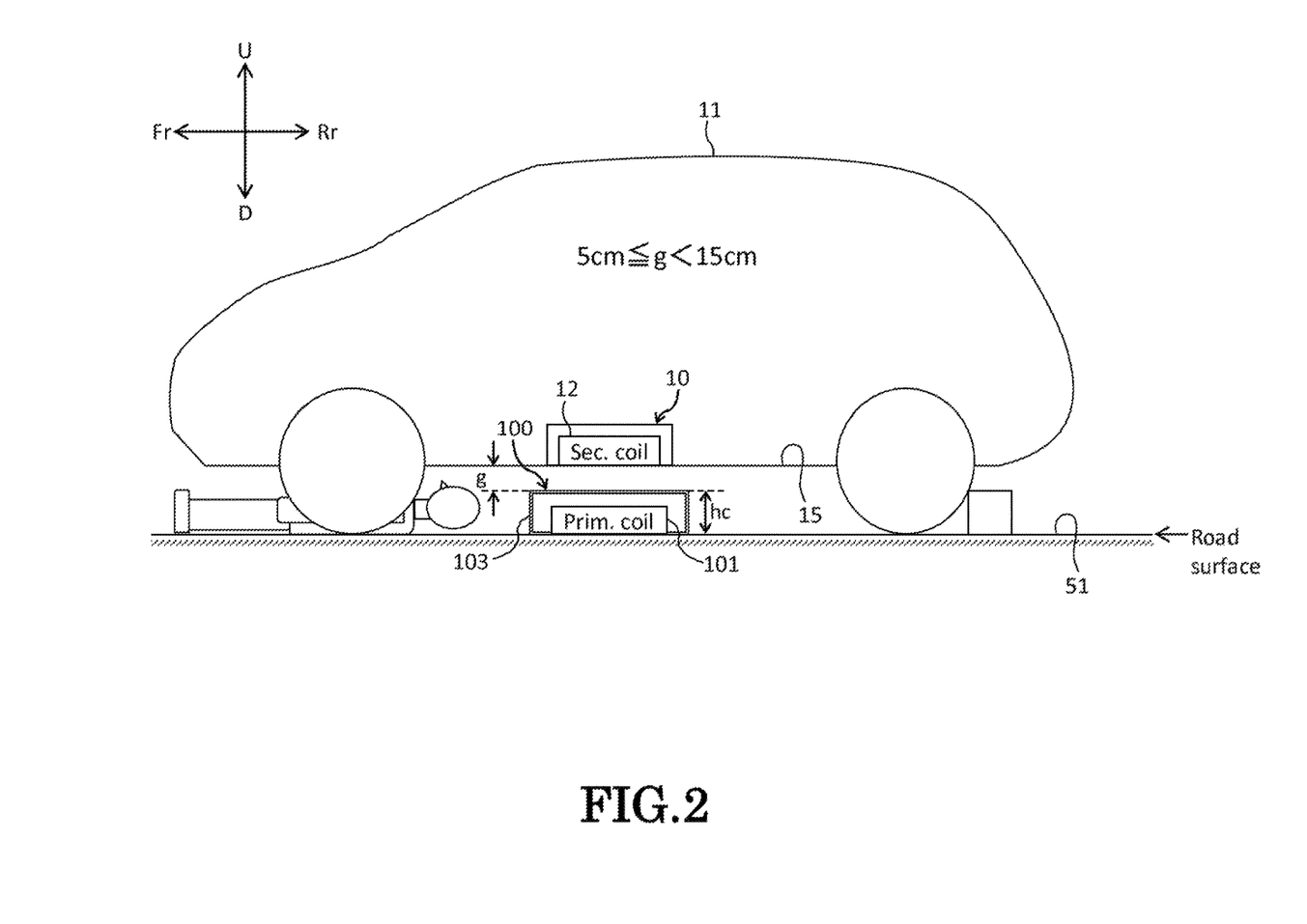
FIG. 2 is a side view showing a state in which the electric vehicle is parked in the parking position where the power transmission apparatus of an embodiment of the invention is disposed.

FIG. 1 is a top view showing a state in which an electric vehicle is in the midst of being driven to be parked in a parking position where a power transmission apparatus is disposed. FIG. 2 is a side view showing a state in which the electric vehicle is parked in the parking position where the power transmission apparatus is disposed. As shown in FIGS. 1 and 2, a power transmission apparatus 100 which is disposed in a parking position of an electric vehicle 11 having a power reception apparatus 10 which receives alternating power in a non-contact manner is disposed on a road surface which makes up a parking facility and is connected to an exterior power system such as a commercial power supply. As shown in FIG. 1, a driver of the electric vehicle 11 drives the electric vehicle 11 so as to move backwards or forwards towards the power transmission apparatus 100 and stops the electric vehicle 11 in a position where the power reception apparatus 10 of the electric vehicle 11 faces the power transmission apparatus 100.

As shown in FIG. 2, the power transmission apparatus 100 has a primary coil 101 and a housing 103, and the power reception apparatus 10 of the electric vehicle 11 has a secondary coil 12. Due to this, when the primary coil 101 of the power transmission apparatus 100 is energized by alternating power obtained from an external power system with respective winding surfaces of the coils lying close to each other while facing each other, it electromotive force is generated in the power reception apparatus 10 by the action of electromagnetic induction, and an induced current flows to the secondary coil 12. A battery of the electric vehicle 11 is charged (charged in a non-contact manner) via a rectifier.

Since the power transmission apparatus 100 is disposed on the road surface making up the parking facility, the power transmission apparatus 100 is easily affected by external stress, rain, wind, dust and the like. Because of this, the primary coil 101 possessed by the power transmission apparatus 100 is accommodated in an interior of the housing 103 which is provided on an installed surface 51 of the power transmission apparatus 100 so as to project in a vertical direction therefrom. The primary coil 101 provided within an internal space of the housing 103 is provided such that the winding surface of the primary coil 101 becomes parallel to the installed surface 51 of the power transmission apparatus 100. When an alternating current is caused to flow to the primary coil 101 by alternating power obtained from the external power system magnetic field is generated, and in particular, a strong magnetic field is generated in a space between the secondary coil 12 of the power reception apparatus 10 which is facing the power transmission apparatus 100 and the primary coil 101.

Figure 3:
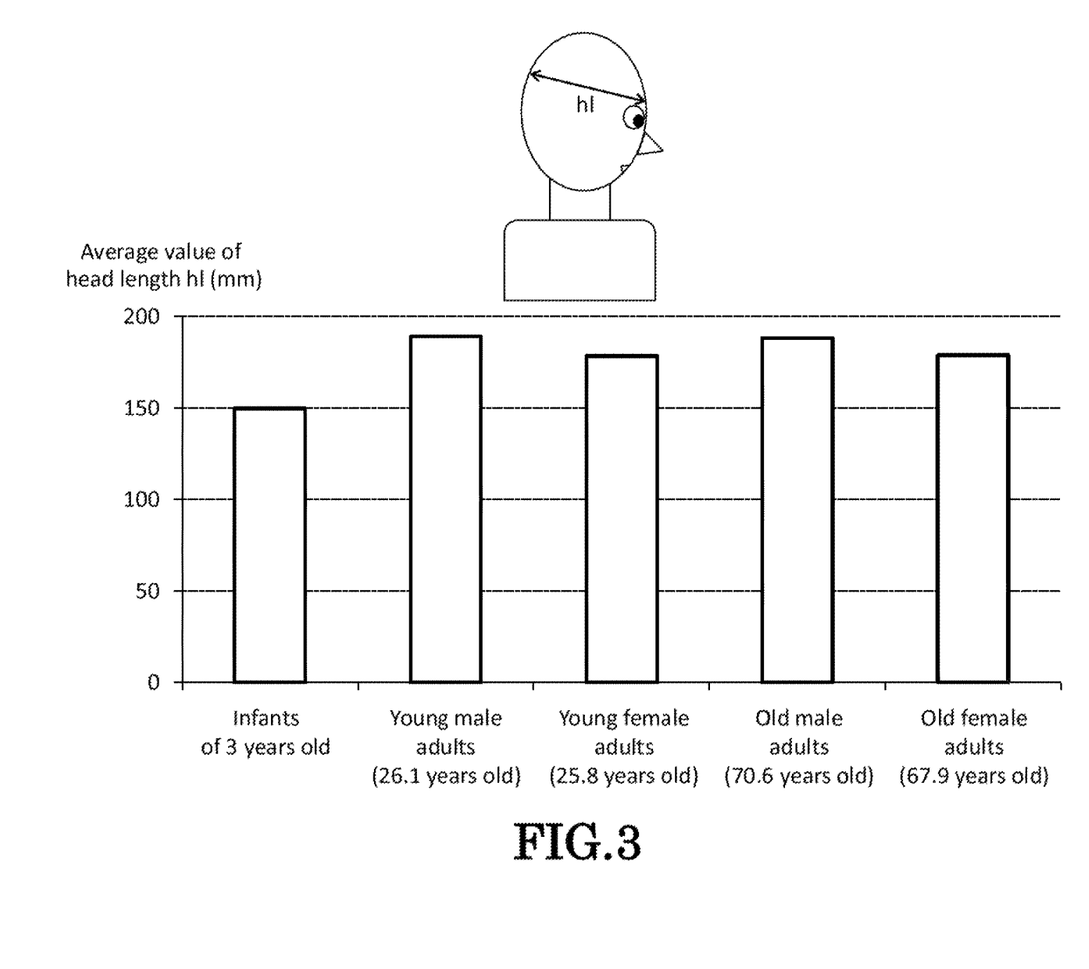
FIG. 3 is a chart showing average values of head lengths of various age levels including infants and adults.

In this embodiment, a vertical height hc of the housing 103 is designed such that a vertical height g of a gap defined by a bottom surface 15 of the electric vehicle 11 and an upper surface of the housing 103 becomes less than 15 cm with the power reception apparatus 10 facing the power transmission apparatus 100 so as to prevent particularly a head portion of a human body from entering the space where the strong magnetic field is generated. The setting of the numeric value of less than 15 cm with respect to the height g of the gap is induced from the fact that as shown in FIG. 3, an average value of head lengths hl of infants of three years old which constitutes a smallest value in average values of head lengths of various age levels including infants and adults is 15 cm. The head length hl is a distance from the glabella point to the occipital point. The glabella point is a point which projects most forwards on the median line in a portion above a root of the nose and between the left and right eyebrows with the orbitomeatal plane staying horizontal. The occipital point is a point on the back of the head which lies farthest from the glabella point within the median sagittal plane.

Figure 4:
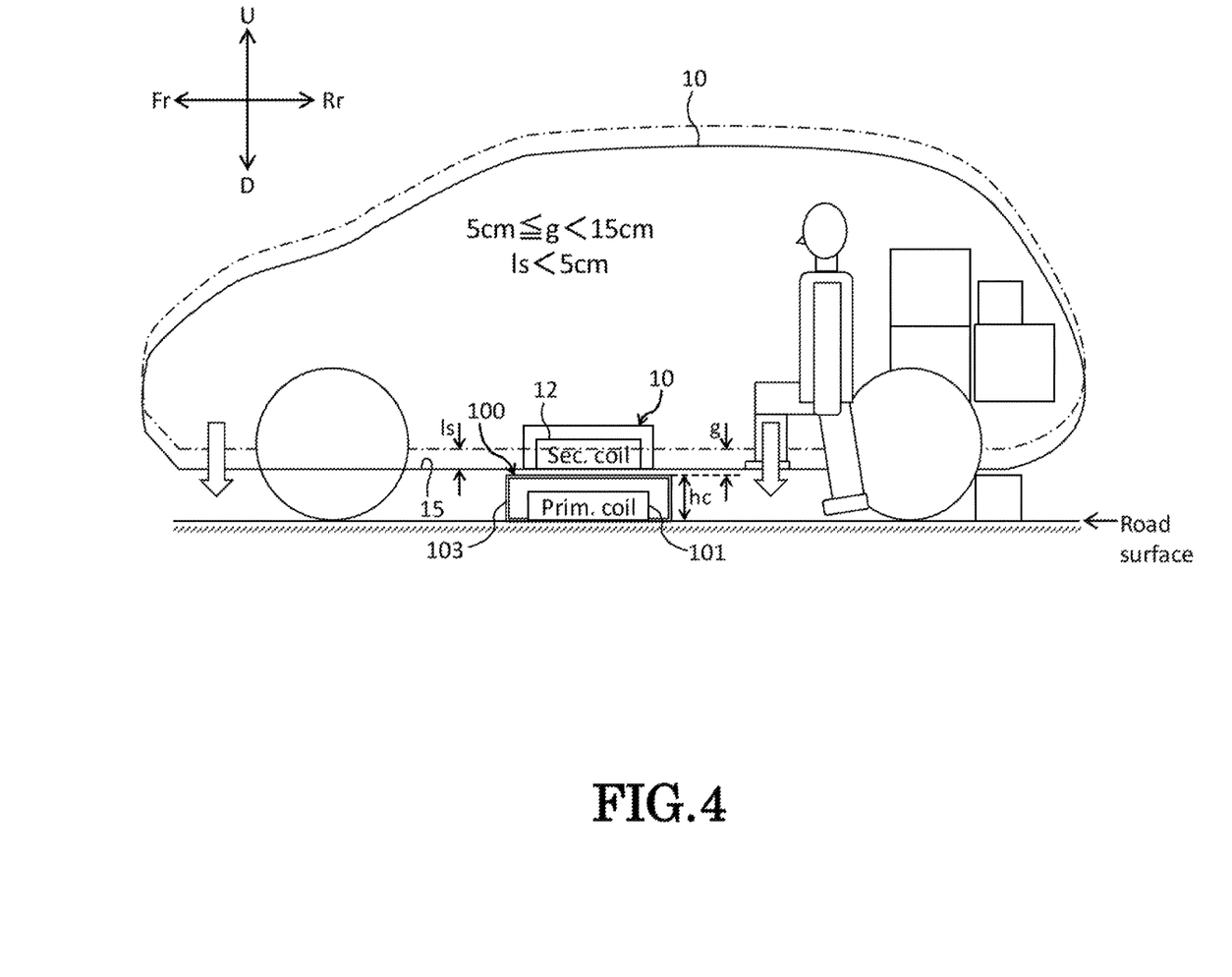
FIG. 4 is a side view showing a positional relationship between the electric vehicle with a lot of cargo loaded thereon whose ground clearance is lowered when an occupant gets in the electric vehicle and the power transmission apparatus.

In this embodiment, a vertical height hc of the housing 103 is designed such that even though the ground clearance of the electric vehicle 11 with a lot of cargo loaded thereon is lowered when an occupant gets in the electric vehicle 11, the vertical height g of the gap is equal to or more than 5 cm to avoid a contact of the upper portion of the housing 103 of the power transmission apparatus 100 with the bottom surface 15 of the electric vehicle 11. The setting of the numeric value of equal to or more than 5 cm with respect to the height g of the gap is induced from the fact that as shown in FIG. 4, a maximum value of a vertical lowering amount ls of the electric vehicle 11 which is generated as a result of an occupant getting in and cargo being loaded on the electric vehicle 11 is 5 cm.

Consequently, in this embodiment, the vertical length hc of the housing 103 is designed such that the vertical height g of the gap is less than 15 cm and equal to or more than 5 cm. According to the power transmission apparatus 100 having the housing 103 which is designed as described above, since the height of the gap is less than the average value (15 cm) of the head lengths of infants, the head portion of a human body can be prevented from entering the gap. Then, since the height of the gap is equal to or more than the maximum value (5 cm) of the lowering amount of the electric vehicle 11, even though the ground clearance of the electric vehicle 11 is lowered when an occupant gets in the electric vehicle 11, the upper portion of the housing 103 is prevented from being brought into contact with the bottom surface 15 of the electric vehicle 11. Consequently, it is possible to provide the non-contact power supply system and the power transmission apparatus 100, and the methods for designing and installing the power transmission apparatus 100 which satisfy the SAE standard for exposure of a human body to magnetic field proscribed under "SAE J2954 v.39 draft" and which are free from a physical contact of the power transmission apparatus 100 with the bottom surface of the vehicle.

Figure 5:
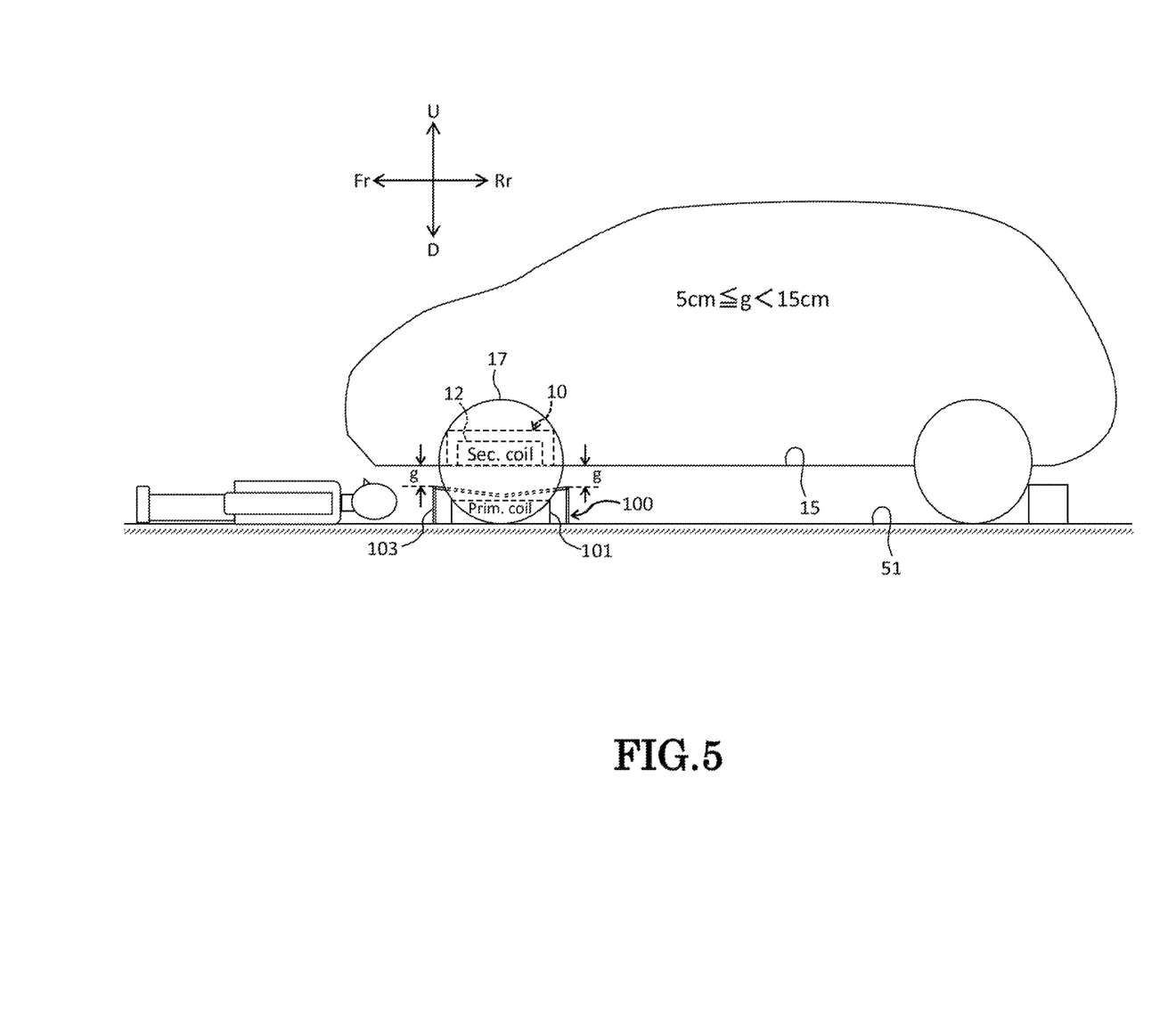
FIG. 5 is a side view showing a state in which the electric vehicle is parked in a parking position where a power transmission apparatus of a different embodiment is disposed.
Figure 6:
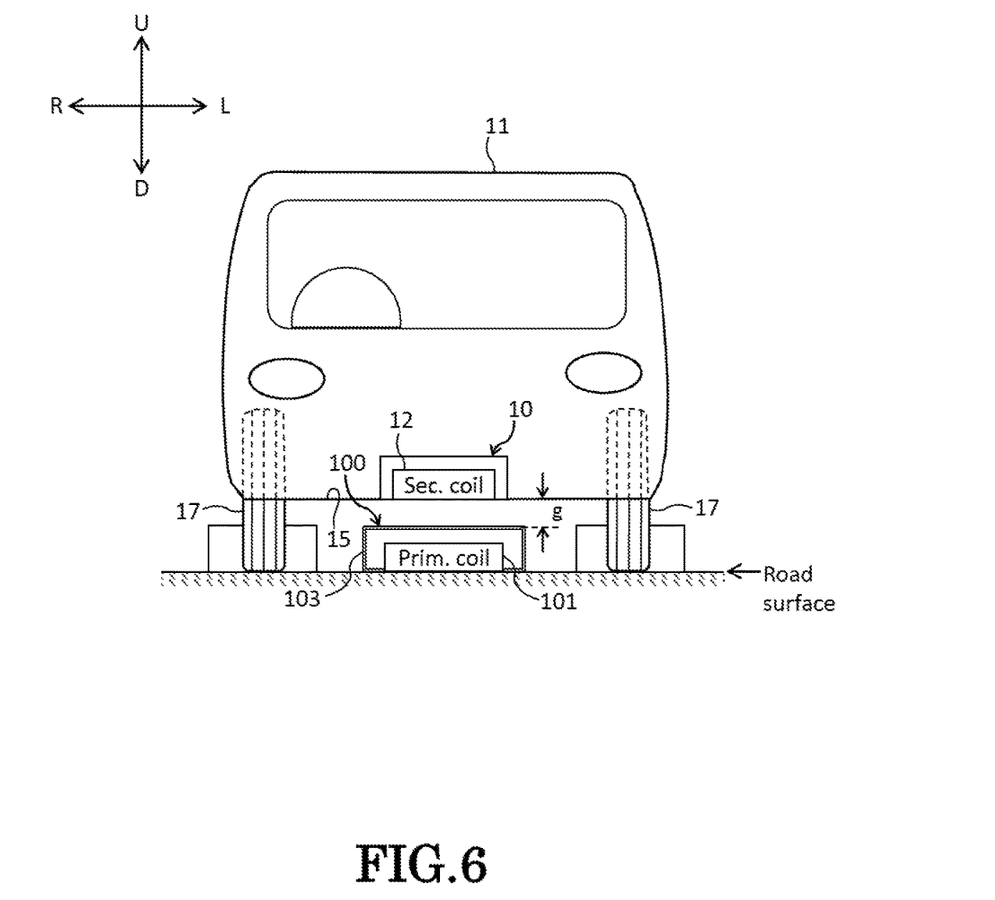
FIG. 6 is a front view showing the state in which the electric vehicle is parked in the parking position where the power transmission apparatus of the different embodiment is disposed.
Figure 7:
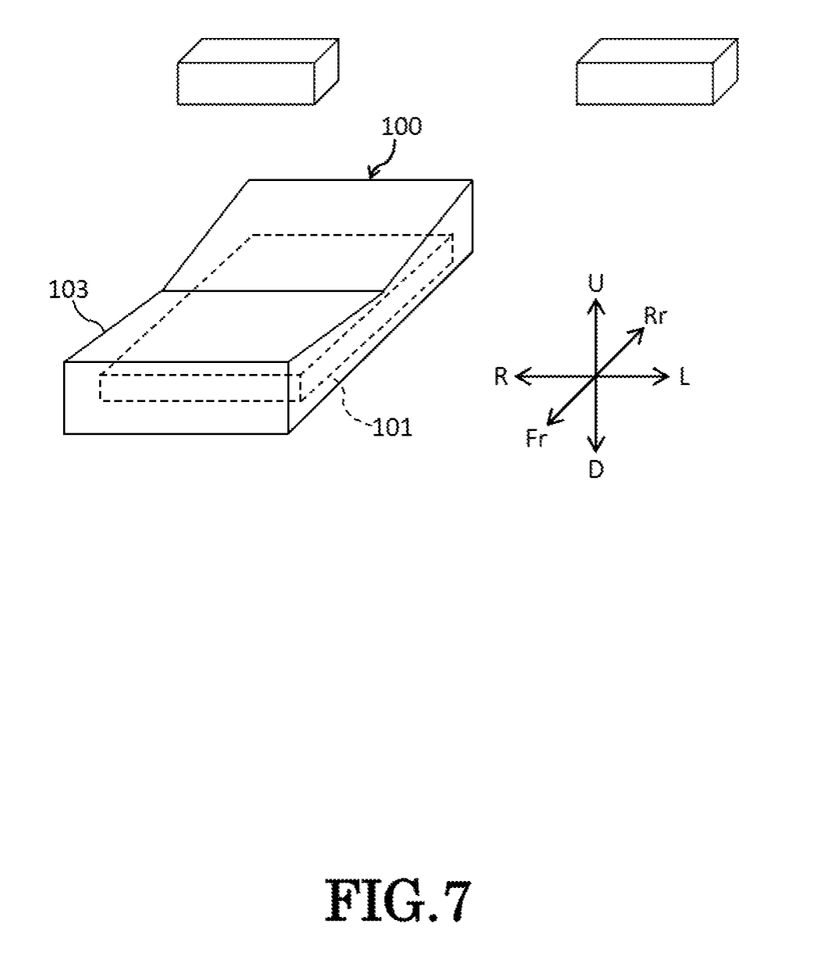
FIG. 7 is a perspective view showing the power transmission apparatus of the different embodiment.

It should be noted that the vertical height hc of the housing 103 does not always have to be such that the height g of the gap is less than 15 cm and equal to or more than 5 cm at any horizontal portion on the housing 103. Namely, an upper surface of the housing 103 may not be at the same height, provided that the head portion of a human body described above can be prevented from entering the gap and that even though the ground clearance of the electric vehicle 11 is lowered, the upper portion of the housing 103 is prevented from being brought into contact with the bottom surface 15 of the electric vehicle 11. For example, as shown in FIGS. 5 and 6, in a case where the power transmission apparatus 100 which faces the power reception apparatus 10 is situated between two front wheels 17, 17 of the electric vehicle 11 with the electric vehicle 11 parked in a parking position, the height g of the gap at the front and rear of the housing 103 should be less than 15 cm and equal to or more than 5 cm, and hence, a height of the gap at a central portion of the housing 103 in the front-rear direction may be equal to or more than 15 cm. Namely, as shown in FIG. 7, a trough-like recess portion may be formed at a central portion of the upper surface of the housing 10 of the power transmission apparatus 100 in the front-rear direction.

Even with this configuration in which the central portion of the housing 103 in the front-rear direction is recessed as described above, since the power transmission apparatus 100 is situated between the two front wheels 17, 17 of the electric vehicle 11, the head portion of a human body is restricted from entering a gap defined by the bottom surface 15 of the electric vehicle 11 and the upper surface of the housing 103 which is formed in the way described above from a left-right or widthwise direction by the two front wheels 17, 17, and the head portion of a human body can also be prevented from entering the gap from the front-rear direction of the electric vehicle 11 due to the height g of the gap at the front and rear of the housing 103 being less than the average value (15 cm) of the head lengths of infants. Further, since the height g of the gap at all the horizontal portions of the housing 103 is equal to or more than the maximum value (5 cm) of the lowering amount of the electric vehicle 11, even though the ground clearance of the electric vehicle 11 is lowered as a result of an occupant getting in the electric vehicle 11, the upper portion of the housing 103 is not brought into contact with the bottom surface 15 of the electric vehicle 11. While the power reception apparatus 10 is described as being disposed between the two front wheels 17, 17 of the electric vehicle 11 in FIG. 5, in a case where the power transmission apparatus 100 is disposed in a position where it faces the power reception apparatus 10 with the electric vehicle 11 whose power reception apparatus 10 is mounted between two rear wheels parked in a parking position, too, the form described in FIGS. 5 to 7 can be applied to the power transmission apparatus 100.

The invention is not limited to the embodiment described heretofore and hence can be modified or improved as required.

DESCRIPTION OF REFERENCE NUMERALS AND CHARACTERS

10 Power reception apparatus
11 Electric vehicle
12 Secondary coil
15 Bottom surface of power transmission apparatus
17 Front wheel
51 Installed surface of power transmission apparatus
100 power transmission apparatus
101 Primary coil
103 housing
g Height of gap
hl Head length
hc Height of housing

The invention claimed is:

1. A non-contact power supply system, comprising:
a power receiving unit which is mounted between two front wheels of a vehicle;
a power transmitting unit which is disposed on a plane and which transmits electric power to the power receiving unit in a non-contact manner; and
a housing which projects in a vertical direction from the plane and which accommodates the power transmitting unit,
wherein the housing has a height in a vertical direction which satisfies a condition that a vertical height of a first gap in a front of the housing is less than 15 cm and equal to or more than 5 cm in a position where the power transmitting unit and the housing face the power receiving unit mounted between the two front wheels, the first gap being defined by a bottom surface of the vehicle and an upper surface of the housing, and
wherein a second gap in a rear of the housing, which is defined by the bottom surface of the vehicle and the upper surface of the housing, is larger than the first gap.

2. A non-contact power supply system, comprising:
a power receiving unit which is mounted between two rear wheels of a vehicle;
a power transmitting unit which is disposed on a plane and which transmits electric power in a non-contact manner to the power receiving unit; and
a housing which projects in a vertical direction from the plane and which accommodates the power transmission unit,
wherein the housing has a length in vertical height which satisfies a condition that a vertical height of a first gap in a rear of the housing is less than 15 cm and equal to or more than 5 cm in a position where the power transmitting unit and the housing face the power receiving unit mounted between the two rear wheels, the first gap being defined by a bottom surface of the vehicle and an upper surface of the housing, and
wherein a second gap in a front of the housing, which is defined by the bottom surface of the vehicle and the upper surface of the housing, is larger than the first gap.

* * * * *